Nov. 7, 1939. C. A. BROCK Re. 21,256
NOZZLE FOR VACUUM CLEANERS
Original Filed May 21, 1934
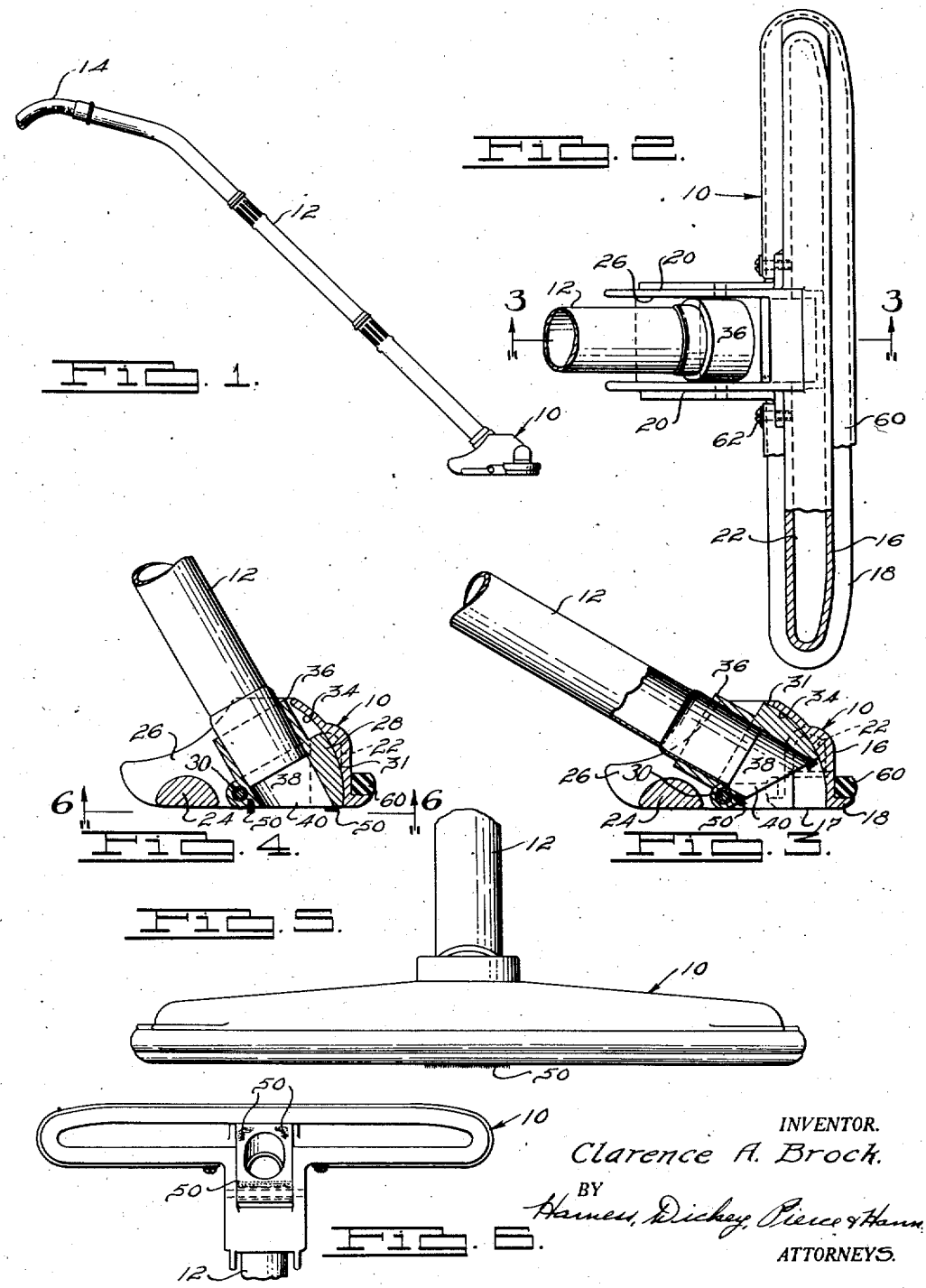
INVENTOR.
Clarence A. Brock.
BY
Harness, Dickey, Pierce & Hann
ATTORNEYS.

Reissued Nov. 7, 1939

Re. 21,256

UNITED STATES PATENT OFFICE 21,256

NOZZLE FOR VACUUM CLEANERS

Clarence A. Brock, Detroit, Mich., assignor, by mesne assignments, to Rexair, Inc., Detroit, Mich., a corporation of Delaware Original No. 2,035,688, dated March 31, 1936, Serial No. 726,720, May 21, 1934. Application for reissue April 10, 1937, Serial No. 136,212

23 Claims. (Cl. 15—156)

This invention relates to nozzles for vacuum cleaners and the like, the principal object being the provision of a construction by means of which the suction effect of the nozzle may be easily and quickly concentrated over a relatively small area or may be extended over a relatively large area.

Objects of the invention include the provision of a nozzle for suction cleaners or the like embodying a structure providing a normal or service suction intake area or port opening for presentation to a carpet or other article to be cleaned, and additionally embodying a member providing an auxiliary or supplemental nozzle and having a port opening normally opening into the main or service port opening but movable relative thereto whereby it may be presented to an article to be cleaned in such a manner as to limit the suction effect of the entire nozzle structure to the port area of such supplementary nozzle only; the provision of a nozzle member for a vacuum cleaner or the like as above described in which the air being withdrawn into the nozzle through the main or service port opening must also pass through the supplementary or auxiliary nozzle port opening; the provision of a device as above described which is controlled entirely by the angularity of the wand or handle for the nozzle; and the provision of a construction as above described that is simple in construction, economical to manufacture and efficient in operation.

Other objects of the invention include a nozzle for vacuum cleaners or the like embodying a main casing having an elongated suction opening or port in a face thereof and a central opening, and a suction connection for the nozzle including a member received in and substantially sealing said central opening and provided with a port opening therein normally opening into the interior of the casing but movable relative thereto whereby to bring it into direct contact with the surface being cleaned so as to concentrate the suction effect of the nozzle structure to the suction connection only which thereby enables the suction connection to function as a supplementary nozzle; the provision of a structure as above described in which the suction connection is pivotally mounted in the casing and in substantial sealing relation with respect to the walls of the opening in which it is received; and the provision of a construction as above described in which the suction connection member is provided with bristles or the like in that face thereof adapted for engagement with the surface to be cleaned.

The above being among the objects of the present invention, the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views.

Figure 1 is a side elevational view of a vacuum cleaner nozzle assembly embodying the present invention.

Fig. 2 is an enlarged fragmentary, partially broken, partially sectioned plan view of the nozzle shown in Fig. 1.

Fig. 3 is a vertical sectional view taken on the line 3—3 of Fig. 2 and showing the suction connecting member or auxiliary nozzle in its normal operating position.

Fig. 4 is a view similar to Fig. 3 but illustrating the suction connection member or auxiliary nozzle in a position to limit the suction effects of the nozzle structure to the area of the port opening in the auxiliary nozzle only.

Fig. 5 is a front elevational view of the nozzle shown in the preceding views on the same scale as in Figs. 2, 3, and 4.

Fig. 6 is a reduced bottom plan view of the nozzle shown in the preceding views, taken as on the line 6—6 of Fig. 4.

Referring to the drawing, there is shown in Fig. 1 a vacuum cleaner nozzle member indicated generally at 10 provided with a tubular wand or handle 12 of conventional construction the upper end of which is shown connected to a flexible tube 14. The opposite end of the tube 14 is adapted to be secured to a suction producing device, not shown, in accordance with certain types of so-called vacuum cleaners. It will be apparent to those skilled in the art from the following description that the particular type of nozzle structure shown and described may also be applied to that type of vacuum cleaner in which the suction producing device is closely associated with the nozzle structure rather than the remotely associated type for which the particular embodiment of the nozzle structure shown in the accompanying drawing is designed, the particular embodiment shown in the drawing being employed as a matter of illustration because of its simplicity.

As disclosed in Figs. 2 to 6, inclusive, the nozzle structure 10 includes a main casing 16 of elongated inverted U-shaped section having opposite ends thereof closed to provide a downwardly opening service section port opening 17 (see Fig. 3). The lower edges of the casing 16 about the port opening 17 are provided with an outwardly extended flange 18 adapted for contact with the floor or other surface which it is desired to clean. The lower face of the flange 18 is curved outwardly and upwardly with respect to the center of the port 17 to enhance the ease with which the nozzle structure may be moved over the surface to be cleaned.

The casing 16 is centrally provided with a pair of rearwardly projecting, vertically disposed webs or walls 20 formed integrally with the casing 16 and spaced laterally from one another with respect to the width of the casing 16, and the space between the walls 20 is in open communication with the hollow interior 22 of the casing 16. A web such as 24, best shown in Figs. 3 and 4, is preferably provided between the walls 20 adjacent their rear or left hand end as viewed in Figs. 1 to 4, inclusive, at the lower edges of the walls and so as to provide an additional area of contact between the nozzle structure and the surface upon which it is supported so as to stiffen the structure as well as to maintain the nozzle structure in the desired normal position with respect to such surface.

The opposed faces 26 of the walls 20 are formed relatively smooth and in planes substantially parallel to each other, and slidably but closely received between the walls 26 is an auxiliary or high suction nozzle member 28 which is pivotally mounted on a pin 30 extending between the walls 20. The front or right hand face 31 of the member 28, as viewed in Figs. 1 to 4, inclusive, is formed to the shape of a part of a cylindrical surface having its axis coincident with the axis of the pin 30, and the casing 26 is formed to provide a curved surface 34 complementary to the surface 31 and adapted for substantial sliding engagement therewith. The auxiliary nozzle 28 is provided with an upwardly extending sleeve 36 integral therewith in which the lower end of the handle or wand 12 is frictionally or otherwise suitably socketed and the hollow interior of the sleeve 36 is in open communication with the opening 38 which extends down through the lower face of the auxiliary nozzle 28 and forms a port 40 therefor in the lower face. The lower face of the auxiliary nozzle 28 is so constructed and arranged that when the handle or wand 12 is raised or lifted to the position indicated in Fig. 4, the lower face of the auxiliary nozzle 28 may lie in contact or in a position to contact a supporting surface around the entire periphery of the port 40. When in this position the side faces of the auxiliary nozzle 28 completely shut off communication between the interior of the nozzle 28 and the interior 22 of the casing 16. If the handle or wand 12 is dropped from the position indicated in Fig. 4 to a position such as is indicated in Fig. 3 for instance, which is the normal position of operation of the nozzle structure, and in which position the auxiliary nozzle 28 has contact with the floor or other supporting surface only immediately below the pivot pin 30, then the port 40 in the auxiliary nozzle 28 is in open communication with the interior 22 of the casing 16 and consequently any suction effect within the handle or wand 12 is apparent within the space 22 over the full area of the port 17 thereof. When the auxiliary nozzle is moved to the position indicated in Fig. 4, the suction within the handle 12 is prevented from exerting its effect within the space 22 of the casing 16 and consequently is limited only to the area of the port 40.

The result of this construction is that during ordinary operation of the nozzle for extracting dust or the like from a carpet or other surface the auxiliary nozzle 28 may be moved to a position such as that indicated in Fig. 3 in which the port 40 is in open communication with the interior 22 of the main nozzle casing 16 and consequently the suction effect is exerted over the full area of the port 17, and when some piece of material such as a thread or some member such as a pin or the like is encountered and which is ordinarily difficult to remove from a surface by the normal suction existing within the main nozzle portion of the device, the handle 12 may be moved to the position indicated in Fig. 4 in which the entire suction effect of the vacuum cleaner may be concentrated over the small area of the port 40 where its higher value will enable such piece of material or member to be picked up. In this connection it may be noted that in the particular construction shown the area of the high suction nozzle port 40 is in the neighborhood of twenty percent of the combined area of the port 17 and connected area between the walls 20 forwardly of the pivot pin 30 which also acts as part of the service nozzle port opening when the handle 12 is in the position shown in Fig. 3. The difference in the effects of the high pressure nozzle as compared to the service nozzle will of course depend upon the relative proportions of their port opening areas when separately effective, but the area of the high suction nozzle port should not exceed one-third of the effective port area of the service nozzle if the most beneficial results are to be obtained.

Thus with the device shown and described by simply raising or lowering the handle or wand 12, the usual suction effect on the entire nozzle area may be caused to be effective for ordinary cleaning purposes and when it is desired to pick up some article that does not readily respond to the usual vacuum effect of the nozzle, the handle may be raised to the position indicated in Fig. 4 and the port 40 may be caused to pass directly over such article whereby the increased vacuum effects apparent therein will cause the article to be withdrawn from the surface. This change in suction effect of the nozzle may be effected by the operator in a simple and easy manner and with a minimum of effort.

The member 24 serves a function additional to that previously mentioned of merely connecting the walls 26 and serving to strengthen them in that it is desirable at times to project the nozzle beneath some piece of furniture such as a bed, or the like, where there is a minimum of vertical clearance and to permit the forward edge of the nozzle to be tipped upwardly away from the supporting surface so as to enable it to be dropped over some particular piece of material which it is desired to pick up. Under such circumstances the handle or wand 12 is dropped to such an extent as to bring the collar 36 into contact with the web 24 and after such contact further dropping of the handle 12 will cause the entire nozzle assembly to tip upwardly about the rounded rear edges of the walls 20 so as to enable the nozzle to be projected over the piece of material which it is desired to pick up.

It may be desirable, under certain circumstances, in order to loosen a piece of material such as a thread or the like which may be partially embedded in or is adhering to the surface being cleaned, to provide some means for mechanically dislodging such piece of material or loosening its adherence to the surface to enable it to be more readily picked up by the nozzle. This may be effected by inserting in the lower face of the auxiliary nozzle 40 a plurality of groups 50 of relatively short bristles or the like, such bristles being relatively short in order to interfere as little as possible with the application of the high suction effects through the port 40.

It is also desirable to provide some means for preventing inadvertent contact between the metallic portions of the nozzle with the legs of furniture or other articles about which the nozzle is being operated and for this purpose I prefer to provide a rubber bumper 60 surrounding the casing 16 above the flange 18. This bumper 60 may take the form of a strip of rubber or other non-metallic material extended around the casing 16 above the flange 18 and projecting outwardly beyond the outer edges of the flange 18, the free ends of the strip being extended to a point adjacent the walls 20 where they may be secured in place by any suitable means such as screws 62.

Formal changes may be made in the specific embodiment of the invention described without departing from the spirit or substance of the broad invention, the scope of which is commensurate with the appended claims.

I claim:

1. In a nozzle structure for vacuum cleaners and the like, in combination, a hollow main nozzle member provided with a surface contact face having a port opening therein, an auxiliary nozzle member movably associated within said main nozzle member, said auxiliary nozzle member having a surface contact portion provided with a port opening therein of smaller area than and a perimeter not greater than twenty-five per cent of the first mentioned port opening to afford a higher velocity suction opening, means for connecting said port openings with a source of suction, said nozzle members being so constructed and arranged that when said face of said auxiliary nozzle member is brought into contact with a supporting surface within the main nozzle it blocks effective communication between said port opening of said main nozzle member and said source of suction and when moved out of a position in contact with a surface it opens communication between said port opening in said main nozzle member and said source of suction through the auxiliary nozzle.

2. In a nozzle structure for vacuum cleaners and the like, a handle adapted for connection with a source of suction, an auxiliary nozzle member stationary with respect to said handle and having a port opening therein adapted for application to a surface to be cleaned, a hollow main nozzle member pivoted to and surrounding said auxiliary nozzle member and having a service port opening therein adapted for application to a surface to be cleaned, said service port opening being at least twice the length of said port opening in said auxiliary nozzle member, said auxiliary nozzle member being movable by said handle to a position whereby to limit the suction effect of said structure to the port area of said auxiliary nozzle member only, and being movable to another position wherein said port opening of said auxiliary nozzle is in open communication with said service port opening.

3. In a nozzle structure for vacuum cleaners or the like, a hollow casing having an opening in its lower face forming an air intake, an auxiliary nozzle member pivotally secured to said casing, means for connecting said auxiliary nozzle member to a source of suction, said auxiliary nozzle member projecting into said casing and having a ported surface contact face optionally movable into contact with a surface to be cleaned within said air intake opening in said casing or to a position to provide open communication between the source of suction and the hollow interior of said casing, said port in the face of the auxiliary member being of a perimeter and area substantially no greater than twenty-five per cent of the perimeter and area of said intake opening in said casing.

4. In a nozzle structure for vacuum cleaners and the like, in combination, a pair of nozzle members each having a face adapted for contact with the surface to be cleaned and a port opening in each face, said port openings being of different areas, one of said members having a vacuum supply opening therein of approximately the same perimeter and area as said port opening therein and said one of said members affording open communication between said vacuum supply opening and the port in the other member when in one position and being movable through the other member thereof whereby to bring its surface contact face into contact with the surface to be cleaned within the area of the port opening of the other of said members, and means limiting movement between said members in at least one direction.

5. In a nozzle structure for vacuum cleaners and the like, in combination, a pair of hollow nozzle members each having a face adapted for contact with the surface to be cleaned and a port opening in each face, said port openings being of different lengths and of different areas, one of said members having a vacuum supply opening therein and the corresponding port opening thereof being of approximately the same perimeter and area as said supply opening and being movable through the other of said members whereby to afford open communication between said vacuum supply opening and the port in the other member when in one position and to bring its surface contact face into contact with the surface to be cleaned within the area of the port opening of the other of said members when in another position, a handle affording an air passage secured to said one of said nozzles and so constructed and arranged as to afford a means for controlling the positions of said nozzles relative to one another and as a unit.

6. A nozzle structure for vacuum cleaners or the like comprising, in combination, a hollow main casing having an elongated port opening in its lower face for contacting a surface to be cleaned and a pocket in open communication with the hollow interior of said casing and extending rearwardly therefrom, an auxiliary nozzle member pivotally secured to said casing and slidabe in said pocket, the perimeter and area of the port opening in said auxiliary nozzle not exceeding twenty-five per cent of the perimeter and area of the port opening in said main nozzle, a handle affording a means for connecting said supply opening to a source of suction secured to said auxiliary nozzle member, said casing and said auxiliary nozzle member being so constructed and arranged as to permit said auxiliary nozzle member to be moved to a position in which it only is effective for producing a suction effect against the surface being cleaned or to a position to place the interior of said casing in open communication with the interior of said auxiliary nozzle member.

7. In a nozzle structure for vacuum cleaners and the like, a hollow casing having a suction opening in its lower face forming an air intake for contacting a surface being cleaned, an auxiliary nozzle member movably secured to said casing, tubular supply means for connecting said auxiliary nozzle member to a source of suction, said auxiliary nozzle member projecting into said casing and having a ported surface contact face optionally movable into contact with the surface to be cleaned within said air intake opening in said casing or to a position to provide open communication between it and the suction opening of said casing, the area and perimeter of the port in said auxiliary nozzle member not exceeding twenty-five per cent of the effective area and perimeter of said air intake opening.

8. In a nozzle structure for vacuum cleaners and the like, a service nozzle member having an opening therein and adapted for substantially constant contact with a surface to be cleaned, an auxiliary nozzle member having an opening therein connected with a source of suction and associated with said service nozzle and optionally movable relative thereto into a position affording open communication for air between the service nozzle opening and the source of suction and into another position of engaging relation with said surface, and an agitator means associated with said auxiliary nozzle normally out of engagement with said surface but movable with said auxiliary nozzle into contact therewith.

9. In a vacuum cleaner, in combination, a main nozzle member provided with a face having a port opening therein adapted to contact a surface to be cleaned, an auxiliary nozzle member engaging said main member and movable relative thereto, said auxiliary nozzle member being provided with a vacuum supply port therein connected to a source of suction and having an opening of not more than twenty-five per cent of the area and perimeter of said port in said main nozzle connected with said port and adapted to contact a surface to be cleaned within the area of said port opening in the main nozzle when said auxiliary nozzle is in one of its movable positions, and to open into the hollow portion of the main nozzle when said auxiliary member is in another of its movable positions relative to said member whereby to afford an unrestricted passage for air between the main nozzle and source of suction.

10. In a nozzle structure for a vacuum cleaner and the like, in combination, a pair of nozzle members each having a face adapted for contact with a surface to be cleaned and a port opening in each face, said port openings being of different areas, one of said members having a vacuum supply opening therein and said port opening therein having a perimeter and area not greater than twenty-five per cent of the perimeter and area of the port opening in the other of said members and being pivotally connected and movable within said other of said members whereby to bring its surface contacting face into contact with the surface being cleaned within the area of the port opening of said other of said members when in one position and to afford open communication for air between its port openings and the vacuum supply when in another position, and means limiting pivotal movement between said members in at least one direction.

11. In a suction cleaner, a nozzle structure comprising an outer nozzle member, and an inner nozzle member movably mounted within the outer nozzle member; said inner nozzle member having an opening for connection to a source of suction and being movable to a position wherein its mouth contacts the surface undergoing cleaning and lies within the mouth of the outer nozzle member to prevent unrestricted communication between the outer nozzle member and the source of suction, and also being movable to a position wherein its mouth is away from the surface undergoing cleaning to offer an unrestricted passage for air between the outer nozzle member and the source of suction through the inner nozzle member, the inner nozzle member being provided with a surface contacting agitating means.

12. In a vacuum cleaner nozzle having a main casing provided with a service opening and an auxiliary nozzle provided with an opening of reduced area connected with a source of suction, said auxiliary nozzle being movably associated with said main casing and movable to a position whereby to limit the suction effect of said structure to the area of the reduced opening and being movable to another position wherein said reduced opening is in open communication with said service opening, in combination, an agitating means upon said auxiliary nozzle for contacting and agitating the surface being cleaned.

13. In a vacuum cleaner nozzle having a main casing provided with a service opening and an auxiliary nozzle provided with a reduced opening connected with a source of suction, said auxiliary nozzle being pivotally mounted within said main casing and movable to a position whereby to limit the suction effect of said structure to the area of the reduced opening and being movable to another position wherein said reduced opening is in open communication with said service opening, in combination, brush means upon said auxiliary nozzle for contacting and agitating the surface being cleaned.

14. A nozzle structure for a vacuum cleaner comprising in combination, a hollow main nozzle member having a working opening therein for contacting a surface to be cleaned, said opening being relatively elongated and having a relatively long perimeter for the area thereof, and an auxiliary nozzle member having a high velocity port therein adapted to contact a surface to be cleaned, said high velocity port having an area not greater than 25% of the area of said working area and having a dimension measured in the direction of length of said working opening less than 25% of the length of said working opening, and means movably mounting said auxiliary member within said main nozzle member so constructed and arranged as to permit said high velocity port to contact a surface to be cleaned substantially within said working opening, when in one position, and to afford unrestricted communication for air between said high velocity port and said working opening when in another position.

15. In a nozzle structure adapted for connection to a source for establishing a fluid pressure differential through said nozzle, the combination of an outer nozzle member having a first portion adapted for direct application to a surface to be operated upon and having a relatively large first port in said first portion; an inner nozzle member having a second portion adapted for direct application to said surface and having a relatively small second port in said second portion in continuous connection with said source; and means pivotally connecting said inner member to said outer member for movement within said first port so that in one relative pivotal position thereof said second port forms a connection between said first port and said source, and in a second relative position thereof said inner member substantially closes off said first port from said source and said second portion is directly applied to said surface.

16. In a nozzle structure adapted for connection to a source for establishing a fluid pressure differential through said nozzle, the combination of an outer nozzle member having a first portion provided with an open underside adapted for direct application to a surface to be operated upon; an inner nozzle member having a second portion adapted for direct application to said surface and having a relatively small second port in said second portion in continuous connection with said source; means pivotally connecting said inner member to said outer member so that in one relative position thereof said second port forms a connection between said open underside and said source, and in a second relative position thereof said inner member substantially reduces the flow between said open underside and said source and said second portion is directly applied to said surface, said inner member having surfaces which engage and seal with portions of said outer member when in said first relative position to minimize leakage between said underside and said source, said members being so constructed and arranged that said sealing surfaces are relatively small.

17. In a nozzle structure adapted for connection to a source for establishing a fluid pressure differential through said nozzle, the combination of an outer nozzle member having a first portion adapted for direct application to a surface to be operated upon and having a relatively large first port in said first portion; an inner nozzle member having a second portion adapted for direct application to said surface and having a relatively small second port in said second portion in continuous connection with said source; means pivotally connecting said members together so that in one relative pivotal position thereof said second port forms a connection between said first port and said source, and in a second relative position thereof said inner member substantially reduces the flow between said first port and said source and said second portion is directly applied to said surface; and agitating means carried by said nozzle structure and disposed to be moved into and/or out of cooperative relation to said surface by movement of said inner nozzle member.

18. In a nozzle structure adapted for connection to a source for establishing a fluid pressure differential through said nozzle, the combination of an outer nozzle member having a first portion adapted for direct application to a surface to be operated upon and having a relatively large first port in said first portion; an inner nozzle member having a second portion adapted for direct application to said surface and having a relatively small second port in said second portion in continuous connection with said source; means pivotally connecting said members together so that in one relative pivotal position thereof said second port forms a connection between said first port and said source, and in a second relative position thereof said inner member substantially reduces the flow between said first port and said source and said second portion is directly applied to said surface; and agitating means carried by said nozzle structure and disposed to be moved by said inner nozzle member into cooperative relation to said surface when said inner nozzle member is moved to said second relative position.

19. In a nozzle structure, the combination of a nozzle member having a service port therein adapted for direct application to a surface to be operated upon, a follower portion extending rearwardly from said port portion, an auxiliary nozzle member for restricting the effective size of said service port; means pivotally connecting said auxiliary nozzle member within said main nozzle at a point between said port portion and said follower portion; and agitating means connected to said nozzle structure and disposed to be moved into and/or out of cooperative relation to said surface by movement of said auxiliary nozzle member.

20. In a nozzle structure, the combination of a nozzle member having a service port therein adapted for direct application to a surface to be operated upon, a follower portion extending rearwardly from said service port, and an auxiliary nozzle member pivotally connected to said first mentioned nozzle member at a point between said service port and said follower portion, said auxiliary nozzle member being movable between one position within said main nozzle member in which it restricts the effective size of said service port and a second position in which the full area of said service port is effective.

21. In a nozzle structure adapted for connection to a source for establishing a fluid pressure differential through said nozzle, the combination of a main nozzle member having a part adapted for direct application to a surface to be operated upon, said part having a service port therein presented to said surface; an auxiliary nozzle member having a part adapted for direct application to said surface and having a relatively small auxiliary port in said part; means forming a connection between said nozzle members and said source; and means pivotally connecting said members together so that in one relative pivotal position thereof said auxiliary member forms a connection between said first port and said source and said second mentioned part is retracted away from said surface, and in a second relative position thereof said auxiliary member substantially reduces the flow between said first port and said source and said second mentioned part is directly applied to said surface.

22. In a nozzle structure adapted for connection to a source for establishing a fluid pressure differential through said nozzle, the combination of a main nozzle member having a part adapted for direct application to a surface to be operated upon, said part having a service port therein presented to said surface; an auxiliary nozzle member having a part adapted for direct application to said surface and having a relatively small auxiliary port in said part; means forming a connection between said nozzle members and said source; means pivotally connecting said members together so that in one relative pivotal position thereof said auxiliary member forms a connection between said first port and said source and said second mentioned part is retracted away from said surface, and in a second relative position thereof said auxiliary member substantially reduces the flow between said first port and said source and said second mentioned part is directly applied to said surface; and floor agitating means carried by said nozzle structure and adapted to be moved into and out of engagement with said surface by movement of the auxiliary nozzle member.

23. In a nozzle structure adapted for connection to a source for establishing a fluid pressure differential through said nozzle, the combination of a main nozzle member having an elongated laterally extending housing portion and a relatively narrow follower portion extending rearwardly from said housing portion intermediate the ends thereof, said housing and follower portions being adapted for direct application to a surface to be operated upon and said housing portion having an elongated service port therein presented to said surface; an auxiliary nozzle member having a part adapted for direct application to said surface and having a relatively small second port in said second portion in continuous connection with said source; and means pivotally connecting said members together so that in one relative pivotal position thereof said second port forms a connection between said first port and said source, and in a second relative position thereof said auxiliary member substantially reduces the flow between said first port and said source and said second portion is directly applied to said surface.

CLARENCE A. BROCK.